June 14, 1966   R. R. KNITTEL ET AL   3,255,470
MOLDED SPRING
Filed March 3, 1964   3 Sheets-Sheet 1

INVENTORS
GEORGE H. NELSON
RONALD H. BECKMAN
HAROLD C. VAKOS
BY RICHARD R. KNITTEL
CHARLES H. BURNETTE

Price & Heneveld
ATTORNEYS

INVENTORS
GEORGE H. NELSON
RONALD H. BECKMAN
HAROLD C. VAKOS
RICHARD R. KNITTEL
CHARLES H. BURNETTE
BY *Price & Heneveld*
ATTORNEYS United States Patent Office 3,255,470
Patented June 14, 1966

3,255,470
MOLDED SPRING
Richard R. Knittel, Box 855, R.R. 1, Martinsville, N.J.;
Harold C. Vakos, 1925 Cliffview, Cleveland, Ohio;
Ronald H. Beckman, 27 Bank St., New York, N.Y.;
Charles H. Burnette, 1219 Panama St., Philadelphia,
Pa.; and George H. Nelson, 25 E. 22nd St., New York,
N.Y.
Filed Mar. 3, 1964, Ser. No. 348,934
6 Claims. (Cl. 5—351)

This application is a continuation-in-part of application Serial No. 256,376, filed February 5, 1963, and entitled Molded Body Support.

This invention relates to a resilient load supporting assembly, and more particularly to a vented, bellows spring cushioning assembly, especially for furniture, mattresses, cushions, automotive and general transportation seating.

The vented bellows assembly disclosed and claimed in the above identified application achieves improved design, strength, comfort, stability, and economy over conventional structures which include (1) coil springs, (2) foam, (3) sealed pneumatic chambers, and (4) arch springs.

As noted in the above application, coil spring assemblies, although providing stability and variable firmness in selected zones of the article, are expensive, complex in structure, and require extensive hand labor to tie the springs together. Foam material ordinarily has one spring constant, does not breathe properly, and is relatively costly to produce due to the expense of foaming molds, and of coring for bottom cavities.

Sealed air chambers are expensive to manufacture and maintain, are not durable, and create the sensation of instability to a person resting on them. This is due to their "balloon" type action and behavior with only slight compressibility. The plastic covered arch-type supports used with modern style seating, are not adaptable to many applications such as, for example, mattresses.

In contrast to these, the vented bellows spring construction simultaneously provides improved stability, simplicity of construction, proper breathing, variable firmness in selected zones of the article, inexpensive construction, durability and other advantages inherent in the assembly.

During experimentation with various modifications of this basic structure described and claimed in the application identified above, several significant features were invented causing the combination to be of far greater commercial significance. Certain pattern arrangements and interengagements of the bellows springs, especially when coupled with specific structural features of the individual springs, achieve a remarkably superior stability, reaction zone control, and variability in spring resistance in the entire article assembly and in various zones thereof.

It is, therefore, an object of this invention to provide a resilient load support of the vented bellows type, having a unique interaction exhibiting a multiple-cushioning effect which is greater than the simple cumulative or additive effect of a plurality of individual springs. The novel support has remarkably greater strength than the prior type. The resistance to further compression becomes greater and greater with increased compression under load. The intermeshed bellows springs normalize and integrate the deflection resistance of the individual springs.

It is another object of this invention to provide a resilient bellows spring support having a gradual, spongy, "bottoming" action under maximum load, with an exponentially increasing resistance with increasing load prior to bottoming, as contrasted to an abrupt or hard "bottoming" action.

A further object of this invention is to provide a multiple-spring, support construction wherein the load applied downwardly on the springs is uniquely transmitted laterally across the springs, yet without the use of tie wires or bands between or across the springs as is conventionally necessary. This occurs even independently of the cover sheet. Moreover, the invention causes the lateral force transmission to occur at all vertical levels of the springs, rather than just at the top as with conventional ties.

Another object of this invention is to provide a body support construction having a large total deflection or compression distance with respect to the height of the bellows springs and the number of bellows in each spring. The inner junctures between the individual bellows, where the plastic wall thickness is especially thick, are arranged in a radially displaced pattern to prevent the plastic from accumulating to unduly limit maximum deflection of the springs under compression.

It is another object of this invention to provide a vented bellows spring assembly requiring anchoring only of a portion of all of the bellows springs in the internested assembly. The remaining unanchored bellows remain in position in the pattern, even under hard usage. The bellows cannot lock in a cocked or tilted position. Nor can any shift laterally out of its established position. The anchorage is simple, but effective. The intermeshed springs form a continuous surface for an overlying cover.

It is another object of this invention to provide an inexpensive flexible support assembly having custom-made qualities yet adapted to mass-production. This is accomplished by employing a bellows spring having a gradual, spongy bottoming action, having increased total deflection capacity for its height, capable of unique interfitting action, and capable of variable firmness when used in pre-arranged patterns with other like bellows springs.

A further object of this invention is to provide a vented bellows spring having a relatively large angle between the legs of each bellows, and capable of repeated deep compression, yet without significant permanent set resulting. Moreover, the bellows configuration causing these advantages, also significantly aids the multiple cushioning effect between several intermeshed springs.

These and other objects of this invention will be apparent upon studying the following specification in conjunction with the drawings in which.

Figure 1:
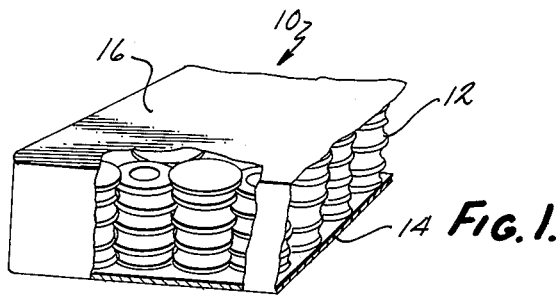
FIG. 1 is a fragmentary, perspective, partially cutaway view of the novel resilient load support device of this invention.

Basically, the inventive, resilient load supporting device comprises a support panel, and a plurality of tapered, intermeshed, vented, blow-molded bellows springs having rounded outer bellows junctures forming arcuate hinges. Some of the internested springs are upright, and some inverted. A cover layer, enveloping the springs, is secured to the panel.

Referring specifically to the drawings, the resilient support assembly 10 includes a plurality of tapered, intermeshed blow-molded, plastic, vented bellows springs 12 enclosed in a casing and retained in a pattern. This casing may include a support panel 14 which is preferably rigid, and an enveloping flexible cover sheet 16.

Each of the bellows springs comprises a hollow undulated wall formed of series of adjacent interconnected individual bellows of a resilient polymer. This polymer is preferably a low density polyethylene. It may alternatively be some other suitable polymer such as a polymer of ethylene and ethyl acrylate mixtures, or possibly a mixture of propylene and polyisobutylene polymers, or similar materials capable of being blow-molded from a central parison into a mold surrounding the parison. In a less preferred form of the invention where the spring is formed by the method of rotational casting, the polymer may be a butadiene polymer.

The internal spring chamber 20 (FIG. 2) defined by the integrally interconnected individual bellows 18 is freely vented to the atmosphere through suitable vent openings 22 formed in one or more of the bellows, or through the bottom opening 40 in the spring which is aligned with an orifice 23 in panel 14. The panel may provide venting passageways in a variety of manners. As one example, the panel may comprise striated plywood with surface grooves allowing air escape.

The blow molding process is preferred because of the low cost of the molds, and the rapidity and accuracy of the process in reproducing springs of identical characteristics. Also springs of varying wall thicknesses can be formed with the same mold. This process is preferred also because of the desirable physical characteristics of the polymeric wall resulting from the polymer being forced radially into the mold while blow molding, and because of a double action compression that results causing each individual spring to compress in two stages when compressed singly.

The wall thickness of the blown spring may be varied by variation of the wall thickness of the initial hollow parison to be blown, and/or by variation of the initial diameter of the parison with respect to the mold. Wall characteristics also vary with the polymeric material employed.

Figure 5:
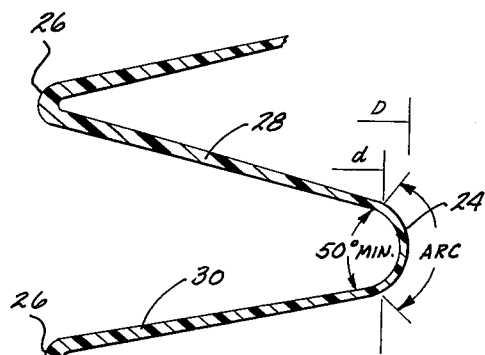
FIG. 5 is an enlarged diagrammatic elevational view of an arcuate outer diameter hinge juncture and two inner junctures.

This blow molding process causes the wall of the outer peripheral extremities 24 of the individual bellows to be thinner than the inner extremities 26, with the change in thickness being gradual over the legs. The greater the radial distance of the spring portion from the central parison being blow molded, the thinner the wall. These arcuate outer extremities 24 have the least resistance to flexing, and therefore, comprise unique hinges which flex controllably over the entire arcuate surface. Each flexible outer hinge is integral with and joins radially outwardly converging legs 28 and 30 of each individual bellows, and is formed by the arcuate portion extending from one leg to the other (FIG. 5).

Almost the entire deflection of each spring, when compressed singly, is a result of the flexure of the outer flexible juncture hinges, with only slight flexing occurring in the legs during spring compression under load. The flexing characteristics of the outer junctures depend upon the thickness of the junctures as well as the materials and the arcuate configuration thereof.

The thicker walled, inner junctures constitute the most rigid portion of the bellows construction. Therefore, when each spring is compressed singly, the inner junctures flex only after the outer junctures have flexed considerably. This creates a unique double-action, since the initial compression or partial deflection of the spring is "soft," and occurs readily under a relatively light load, with flexure of the outer, thin, arcuate hinges. This is followed by a second partial depression, due to flexure about the inner junctures, but only under a substantially greater load.

More specifically, if each tapered spring is compressed individually, the largest diameter juncture i.e., the uppermost hinge (see spring on the far left in FIG. 2 for example), is the first to react. This is because the wall thickness of the hinge is the least on this bellow. After this uppermost bellow is deflected a small amount, resistance to further deflection becomes equal to the initial resistance to deflection of the adjacent bellow. Then, the next or second largest bellow begins to compress until its resistance increases to equal that of the third bellow. This sequential compression continues down to the smallest bellow which has the thickest outer juncture. Thereafter the spring begins to compress about the inner junctures which are substantially thicker and, therefore, offer greater resistance. The area about the largest diameter inner juncture (the uppermost one in the spring on the far left in FIG. 2) begins to compress first and this sequential action continues down to the juncture of smallest diameter. As a concrete illustration, springs of the novel construction, mounted on a panel to form a mattress, but not intermeshed, would readily compress the initial amount under the weight of a body. Then localized springs would be compressed under "bony" parts of the body such as a hip, but with substantially greater resistance to deflection. This effect creates good comfort, yet without abrupt bottoming. This double-action is reduced considerably between intermeshed springs due to a normalizing effect to be discussed hereinafter, but is believed to be present even then to some extent depending upon the degree of intermeshing, to provide optimum comfort when balanced with other characteristics. It will be noted that when the springs are not intermeshed, each spring acts singly except for load distribution by the cover sheet.

The bellows springs can also be formed by rotational casting processes. However, blow molding is certainly preferred due to the unique structural features obtainable when employing blow-molding techniques, as explained herein.

For optimum intermeshing and stability, and for maximum compression without bottoming, the springs are preferably tapered lengthwise from one end to the other. This tapering causes the smaller diameter bellows to have a thicker outer hinge or juncture than the larger diameter bellows. This wall thickness variation occurs because the wall thickness decreases gradually with increasing distance from the center of the spring.

The smaller diameter end may also have an enlarged bellow 42. The enlarged structure of the base bellow 42 serves to more effectively nest the inverted springs with the upright springs, forming a generally continuous surface in contact with panel 14, and with the cover sheet 16 when the spring is inverted. This enlargement is not always necessary (see FIG. 8), such as in springs having a degree of taper significantly smaller than that shown, or of shorter length so that the diametral difference between the smallest and largest bellows is not very great.

Figure 2:
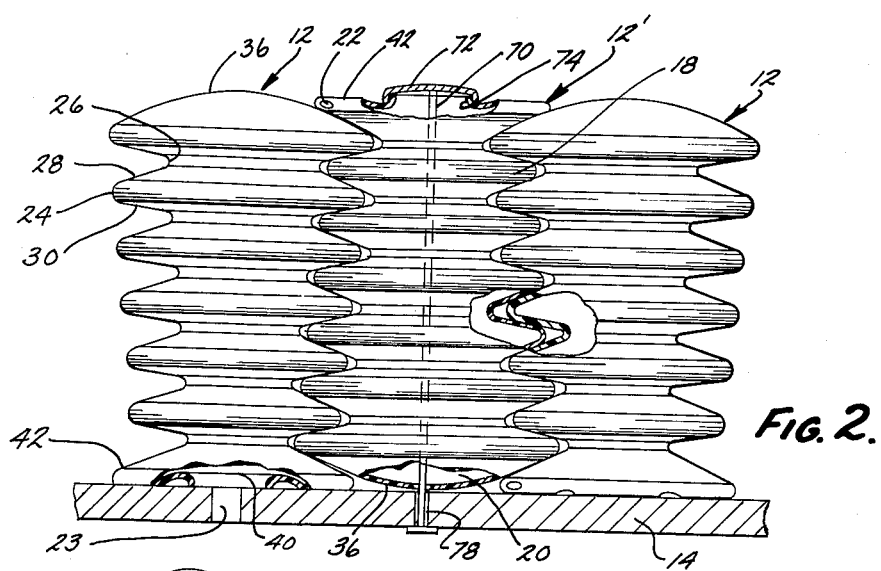
FIG. 2 is a fragmentary, partially sectioned, side elevational view of a portion of the assembly illustrated in FIG. 1.

It will be noted that the cap 36 is convex and has a curvature which nests closely against the sloping surface of the upper leg of the adjacent base bellow 42 (FIG. 2). Thus, the top bellow of an inverted spring is supported and, as will be explained, its reaction like those of other bellows is controlled.

Figure 3:
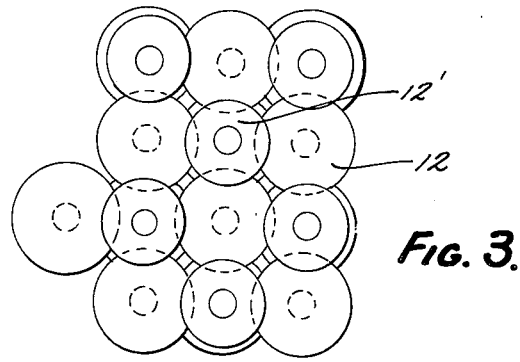
FIG. 3 is a fragmentary top plan view of a portion of the apparatus illustrated in FIGS. 1 and 2 showing the intermeshing pattern arrangement of some of the springs.

The tapered construction provides improved intermeshing between the springs. Each inverted spring 12' (FIGS. 2 and 3) is surrounded by and intermeshed with a plurality of upright springs, shown as an example in FIG. 3 to be four in number. Each upright spring is likewise surrounded by a plurality of, for example, four inverted springs, in the representative pattern shown, except the outermost springs on the edge. The amount of taper is limited, since if the degree of taper is too large for the length of the spring, one end of the spring becomes too small while the other end becomes excessively large. When this happens, the small base provides inadequate support for the spring and makes it unstable against tilting. At the same time, the excessive enlargement of the top bellows 36 provides an outer hinge of such reduced wall thickness that its action is impaired and it fails to act in unison with the other bellows. Also, the top surface of the assembly becomes deeply sculptured due to failure of the small base bellow 42 to occupy fully the gap between adjacent upright springs. This lessens both the utility and the stability of the pattern.

Figure 6:
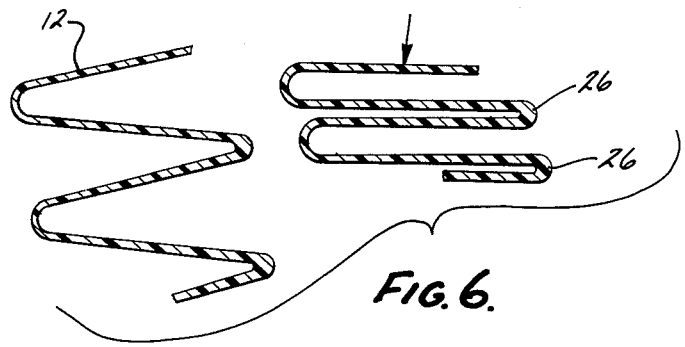
FIG. 6 is a diagrammatic elevational view showing the action of a tapered spring of uniform diameter under compression loading.
Figure 7:
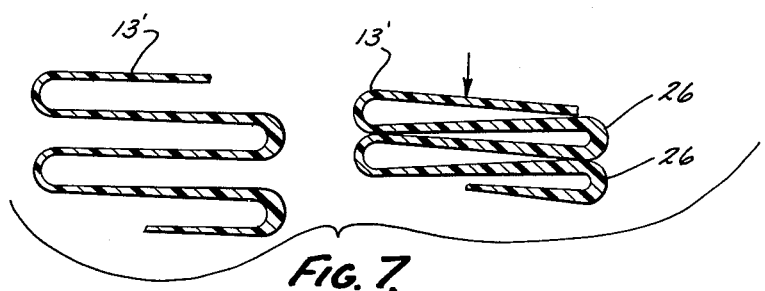
FIG. 7 is a diagrammatic elevational view showing the action of a spring of uniform diameter under compression loading.

The tapering also achieves another important function to be explained with reference to FIGS. 6 and 7. Referring to FIG. 7 which illustrates a bellows spring of uniform diameter, it will be seen that in such a spring the inner junctures 26 tend to accumulate directly upon each other when the spring is compressed. These inner junctures have a substantial wall thickness, a characteristic resulting in the blow molding process. This accumulation of plastic material unnecessarily limits the total deflection of the spring. Thus, the total deflection of the spring from its fully expanded state, through the partially compressed state as shown at 13 in FIG. 7, to the totally compressed state as shown at 13' in FIG. 7 does not utilize the full capacity of the several interconnected bellows. As contrasted to this, the tapered bellows construction shown in FIG. 6 enables the expanded bellows 12 to be compressed substantially farther since, when compressed the same amount as that in FIG. 7, the inner junctures do not seat directly one upon the other. Rather, each inner juncture is radially displaced from the others. The total deflection possible from the springs is therefore much greater before "bottoming" occurs. Further, with the tapered configuration, if bottoming does occur, it is less abrupt, and the effect is cushioned or "spongy."

The larger upper end of each spring has a generally convex, dome-shaped enclosing web 36 forming a cap. The opposite or bottom end includes an opening 40.

In the normal uncompressed state, the angle between the legs 28 and 30 of each bellow should be greater than an angle of about 50° minimum (FIG. 5) to obtain a proper blow-molded hinge. If the angle is significantly less than this, the wall thickness of the outer arcuate hinge tends to be too thin because of the difficulty of forcing the polymer into the corresponding mold cavities. Thus, it is too weak to supply its share of support. Also, the bellows tends to have an insufficient range of flexure, since the total flexure of each bellows is determined largely by the initial angle of separation of its legs. The combination of these two factors detrimentally lessens the spring support below a useful amount. However, it has been found that if the angle is about 50° or greater, when using the ordinary sharp apex on the outer juncture, the fiber stress in the plastic of the outer hinge becomes so great that a permanent set results.

Remarkably, it has been found that the novel arcuate outer hinge configuration actually enables these large angles to be employed yet without the occurrence of significant permanent set. This is believed to be because the flexing action occurs over the entire arcuate area rather than at a concentrated sharp apex. Whatever the technical explanation happens to be, the fact remains that these two normally incompatible, and very important characteristics are thus made completely compatible, thereby making bellows springs extremly useful.

This arcuate configuration has been found to be advantageous for other reasons also. This feature, coupled with others, causes the springs to have a "spongy" rather than an abrupt bottoming action under maximum compression. The resistance to compression increases with increasing load, and just prior to maximum compression, the resistance increases generally exponentially, i.e., the increase is rapid, but still at a rate, instead of instantaneously, so that a certain springiness remains even at the point of bottoming rather than a harsh, abrupt, unpleasant halt. This arcuate configuration is also of utmost importance for the squeezing and hinge bulging action occurring under load when the springs are intermeshed, as will be explained hereinafter.

While each of the bellows springs is shown to be generally circular in configuration, i.e. a tapered cylinder, each can conceivably be of polygonal cross-sectional configuration also.

When the springs are placed in a predetermined pattern at calculated spacings, at least some springs are anchored, preferably by attachment to panel 14. This may be done in several ways, one of which is by elongated tie members 70 having caps 72 at the upper end. Each cap surrounds the projecting annular lip 74 adjacent opening 40 on the bottom of each inverted spring. Each tie member extends through a spring, through a tiny opening in the inverted top 36, through an opening 78 in panel 14, and is secured at the bottom of the panel by enlarging the head, or with other suitable securing means such as a button. The tie member preferably is a flexible member which folds when the spring is depressed. When the load on the spring is released, it straightens until it reaches maximum length, at which point it limits further axial expansion of the spring.

This method of anchoring is illustrative only. Other methods can be just as readily employed. With the modified springs in FIGS. 8, 9 and 10, for example, the main openings 140 and 140' for exhausting are all in the lower ends of the upright springs 112 (i.e. upwardly divergent) and the inverted springs 112' (i.e. downwardly divergent). Consequently, attachment may be by stapling, adhesion, or some other equivalent rather than through holes on both ends. The lower vents 140 may cooperate with orifices in the support panel 114 (shown in phantom) as previously. Other vent exhausts, which preferably supplement the lower end vents, are formed at 125 in the inner junctures. The location is preferred since, due to the thicker wall at this location, the inner junctures do not compress completely so that vents 125 are never closed off. This is especially true of the smaller diameter inner junctures.

Figure 8:
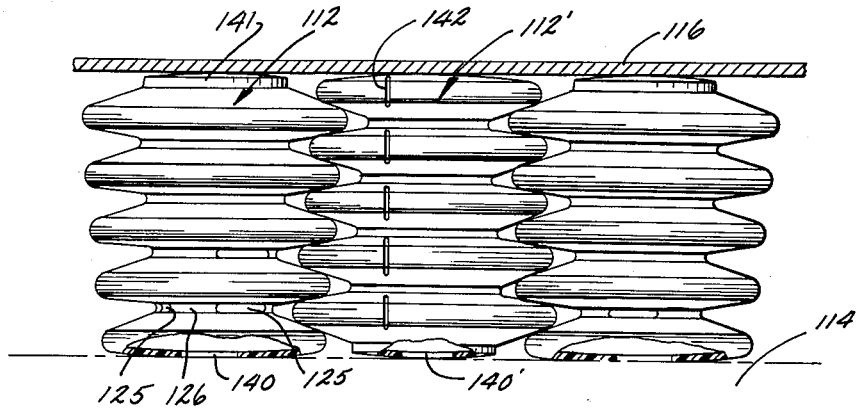
FIG. 8 is a fragmentary, enlarged, side elevational, sectional view of a spring assembly employing a modified spring construction.
Figure 9:
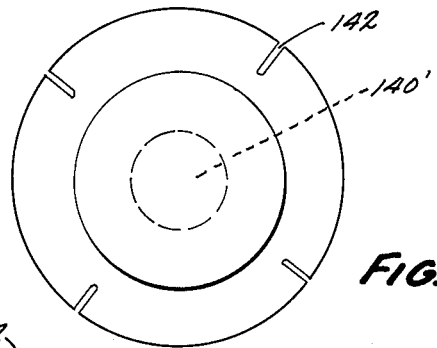
FIG. 9 is a plan view of the center spring in the assembly illustrated in FIG. 8.
Figure 10:
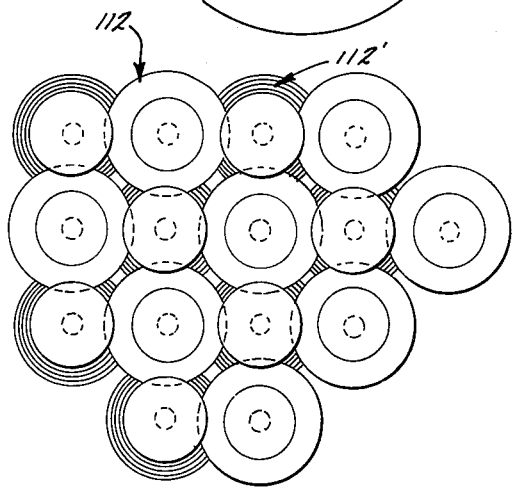
FIG. 10 is a plan view of a spring pattern in an assembly of the modified springs of FIG. 8.

An alternative venting is shown in the central spring in FIGS. 8 and 9. Here, vertical longitudinal slits 142 are cut into the stack of bellows at spaced intervals around the spring. Neither of these alternatives appreciably lessens the supporting strength of the springs if adequately spaced for the particular use, while decidedly aiding to eliminate the "swooshing" noise and effect of the springs with rapid air exit. Obviously, either type vent can be provided on upright or inverted springs.

The modified spring includes no enlarged bellows on the smaller diameter end, since the degree of taper and overall length are not great enough to require it.

The cap 141 of the springs on the largest end bellow protrudes axially of the spring to space the bellows in proper interfitting alignment with adjacent springs, while yet providing a relatively continuous surface in conjunction with adjacent springs to cooperate with cover sheet 116, forming a uniform support area when the springs are internested.

Figure 4:
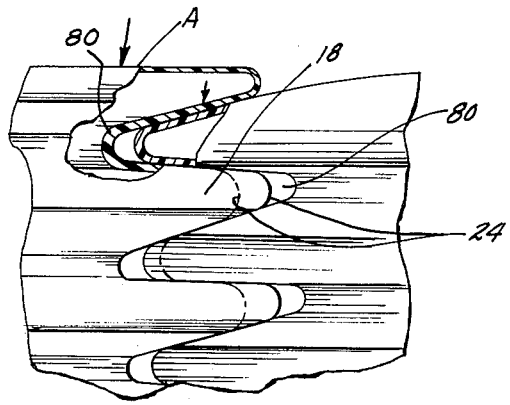
FIG. 4 is an enlarged fragmentary elevational view of a pair of bellows springs partially compressed to show their interaction.

The springs mounted on the panel are internested by intermeshing their bellows and grooves as illustrated. When axial force is applied to the springs in an area to compress them axially, the legs of each bellow of each spring are pressed against the abutting legs of the nested bellows of adjacent springs. Each individual bellows is forced to expand radially outwardly into the space 80 (FIG. 4) remaining in the groove into which the bellows 18 fits. If the bellows springs are internested so tightly that this space 80 is initially filled, little, if any, compression can occur. Thus, this space is purposely left.

In use, when a load is applied to a focal point anywhere on the flexible cover sheet of the resilient load supporting device 10, the load is distributed over several of the bellows springs. If the novel springs are not intermeshed, distribution must take place solely due to flexing of the non-stretching cover sheet. However, the springs are preferably intermeshed due to the unique interaction resulting. When so intermeshed, the forces created by a load are actually transmitted laterally between springs in an area, i.e. radially out from the area of concentrated load application. This interaction causes the major load distribution. This will occur even in the absence of any load distributing effect of the flexible covering sheet. A relatively small zone of reaction is involved, compared to conventional coil spring structures. Yet the zone is sufficiently large to prevent discomfort caused by concentrated resistance to depression, or caused by abrupt bottoming. This zone of reaction assumes the form of a gradually varying concavity since the springs being deflected or compressed, deflect and tip adjacent springs lesser and lesser amounts to provide optimum form fitting and cushioning characteristics. The degree of reaction is graduated outwardly in all directions from the focal point of the load. As the springs are compressed, the air in the chambers 20 is vented freely through openings 40, 22, 140 or 142 in the springs, and 23 in the panel if necessary. The important thing is that there is insignificant pneumatic resistance to interfere with the controlled cushioning effect obtained by the flexing of the hinge arc and intermeshed bellows.

Experimentation with the intermeshed springs has shown the surprising result that the total support capacity of a plurality of the springs is far greater than the expected additive support capacity of the individual springs. Upon closer study of the novel assembly, it was determined that the total resilient support effect is due to at least three individual effects.

The first effect involves the expected cumulative resistance to deflection of the several springs due to individual hinge resistance to flexing under load. The second effect involves the frictional resistance between bellows of adjacent springs as they extend radially outwardly with compression and slide together. The third effect, and perhaps the most important, is caused by an interference fit between the springs, and involves the necessity of the compressed bellows, and especially the arcuate outer ends, to bulge radially outwardly into the adjacent grooves, in spite of their increasing resistance to this action as the springs are squeezed further together, causing the free arcuate ends to constantly decrease in size. Each of these resistance forces increases markedly with each increment of further compression. All of these factors cooperate to achieve the final result. Consequently, an explanation of each factor, taken separately, is really incomplete. This is especially true with respect to the second and third factors which are closely interrelated. However, for purposes of providing a detailed explanation, each will be described briefly.

Regarding the first factor, as any one or a few springs are compressed under a concentrated load, the compressed bellows immediately contact and depress adjacent springs. Since each spring can tilt somewhat, as one side is depressed by another spring, the opposite side will only partially depress as the spring tilt occurs. The next spring will tilt also and be depressed a lesser amount. This continues until the effect is dissipated over the zone or reaction. Of course, the cover sheet also causes partial distribution of the load.

Since the legs of each bellow engage the legs of two straddling bellows of each adjacent spring, and since axial compression of a spring causes radial expansion (see e.g. the normal position shown in phantom in FIG. 4 as contrasted to the partially compressed position shown in solid in FIG. 4), these legs must slide over one another during compression, producing the second effect above. The frictional drag resulting causes total deflection to be less than would normally be expected from the additive effect of the springs since total resistance to deflection is greater. Moreover, after partial compression and deflection has occurred, further deflection requires an increasingly greater force because the pressure between the rubbing, sliding legs becomes even greater, causing the frictional resistance to sliding to be greater. This increasing resistance factor occurs over the total deflection of the spring.

The third interference fit reaction mentioned above still further increases this changing resistance to deflection due to the steadily decreasing portion of the outer juncture arcuate hinge remaining free to bulge into the cooperative groove of the adjacent spring. More specifically, referring to FIG. 4, as the outer arcuate hinge moves radially outwardly from the position shown in phantom when the spring is expanded, to the position shown in solid where the spring is partially compressed, the free arc length or size has decreased substantially. This decrease continues as each bellows is squashed, and must bulge into smaller and smaller sections of the groove 80. The resistance to further radial expansion therefore increases markedly, requiring greater axial load to achieve another increment of spring deflection. This important effect supplements the two effects previously noted, to provide a spring with optimum qualities, with initial deflection occurring readily, and with each additional increment of deflection requiring a greater-than-proportionate force. Hence, the multiple action effect occurs.

The three effects taken together cause the several individual untied springs to react in a unitary fashion, with dissipation of the applied force occurring laterally, radially outwardly from the point of concentration. The lateral force distribution moreover occurs between all levels of adjacent springs, rather than just across the tops of the springs.

The amount of the double-action, referred to with respect to the compression of each spring, that remain in the intermeshed assembly, depends upon the degree of intermeshing. If the bellows are only slightly overlapping, a significant double-action effect remains, with the outer junctures deflecting first, and the inner junctures deflecting significantly only after substantial spring compression. With full intermeshing, however, the thinner, highly flexible, outer junctures are adjacent the thicker, slightly flexible, inner junctures of adjacent springs so that flexing of the outer junctures tends to force some flexing about the inner junctures, producing an over-all normalizing effect. This further integrates the individual springs into a cooperative whole with substantially different, and highly advantageous characteristics.

The degree to which the springs are intermeshed controls not only the amount of compression which can occur before interaction is effective, but the degree to which interaction is effective in restraining the action of the individual spring. Thus, by the simple expedient of varying the degree of intermesh, the effective resistance of the assembly to a given load can be varied as required. This can be done throughout an entire assembly or it can be varied in selected zones to produce an almost endless pattern of load resistance variation. Thus, in a single assembly the resistance can be varied from that characteristic of springs acting as individual components which bottom relatively quickly to areas where the springs are so tightly intermeshed that compression is effectively limited to only a small portion of the total axial length of the spring. It will be understood that such variations are readily incorporated in the assembly without costly tooling, manual labor or significant increase in material costs. An article of furniture can be assembled with greater resistance to deflection in zones of weight concentration, and lesser resistance to deflection in varying degrees in other zones.

The cushioning effect or resistance to compression of each zone can be varied in another way, that is, by inserting springs of different wall thickness. This thickness is varied by altering the amount of material in the unblown parison introduced into the mold cavity, by varying the parison wall thickness or the parison diameter, or both. Actually, the resistance to flexing by the wall is proportional to the cube of the wall thickness. Thus, by doubling the thickness, for example, the resistance to compression is increased by 8 times. This is controlled for each bellows in accordance with the following relationship:

$$\frac{P}{Y}\max. = \frac{(E)(\pi)(D+d)t^3 \text{ av.}}{(D-d)^3}$$

where $P$ = Load or weight on spring (lbs.)
$Y$ max. = Deflection at inner juncture (in.)
$E$ = Flexural modulus of the polymer
$D$ = Diameter at outer juncture (hinge arc) (in.)
$d$ = Diameter at inner juncture (in.)
$t$ av. = Average thickness of material in outer arc (in.)

When this equation is applied to a bellows having sharp apex type junctures, D is the outer juncture and $d$ is the inner juncture. However, when applied to a bellows having arcuate junctures, D is still the largest diameter of the outer arcuate juncture or hinge arc, but $d$ becomes the diameter of the inner limit or point to tangency of the hinge arc with the legs 28 and 30 of the bellows (see FIG. 5). Actually, since the springs are tapered, this value will vary from bellows to bellows, so that the overall value for each spring involves a very complicated mathematical function of several of these equations.

When the springs are blown from a material such as a low density polyethylene, for example that sold by Union Carbide Corporation under the designation DND 2450, the resulting equation for deflection of the spring can be expressed as a factor of the weight of the spring in relation to its length. For example, applying the above equation to a polyethylene spring assembly, and coupling it with varying equations arising from the specific spring design, the K-factor (deflection factor) in pounds per square inch compressive stress, per inch of deflection of a pattern of 61 or more 5 inch springs of the design in FIG. 2, is 108 times the weight of the spring in pounds cubed. For a seven inch spring this factor is 39.5 times the weight of the spring cubed.

It will be obvious to those having ordinary skill in the art that the various devices or means used to develop the bellows springs or to retain them in their nested or intermeshed relationship to each other, may vary widely. In some instances, the assembly could be retained by a simple decorative covering. In others, padding material may become necessary. Conceivably, a peripheral, heavy gauge wire support could anchor the tops of the outermost springs by tying the springs to the wire. Countless other variations will readily be conceived.

Each supporting device can be made with custom characteristics to suit the use of the device. To this end, the final assembly can be tailored to the flexibility desired, the configuration of the article, the zonal variations required, the edge support needed, the amount of resiliency necessary, and many other such factors. The obvious modifications to suit these particular conditions of application are deemed part of this invention, providing the principles taught herein are employed. Thus, this invention is not to be limited merely to the illustrative material presented, but only by the scope of the appended claims, and the reasonably equivalent structures to those defined in the claims.

We claim:

1. A resilient load supporting device comprising: a support means; a plurality of resilient, bellows springs retained in a closely spaced pattern on said support means; the inside of each spring being hollow and vented to the atmosphere, allowing unhindered air flow in and out; the walls of each spring being formed of a series of integrally joined individual bellows collectively providing the resilient support of the spring; each bellows formed by a pair of outwardly converging legs having an outer juncture forming a resilient arcuate hinge biased to an expanded attitude; said bellows capable of being compressed varying amounts under load to flex said hinge, and of returning to the original expanded attitude upon removal of said load due to its inherent resilience, all without significant pneumatic hindrance from air in said spring; and said bellows springs being intermeshed with each other to obtain a multiple cushioning action therebetween, with resistance to compression greater than the cumulative resistance of the several individual springs.

2. The device in claim 1 wherein said bellows springs are internested in a manner causing legs of each bellows to contact legs of adjacent bellows of adjacent springs; said contact increasing in force with compression of said springs, said arcuate hinge being decreased in free hinge area with compression of said springs, and said bellows being expanded radially with axial compression of said springs, thereby creating a cooperative total effect between said springs, greatly resisting further compression.

3. The resilient load supporting device in claim 1 wherein each of said springs has a tapered configuration from end to end; part of said springs mounted upright and the remaining part of said springs being mounted in an inverted position; said springs being arranged in a pattern with each upright spring being spaced from adjacent upright springs by inverted springs; and the bellows of the inverted springs being intermeshed to a predetermined depth with the bellows of the upright springs to cause said springs to act cooperatively over a reaction zone when a load is applied to some springs in said zone.

4. The resilient load supporting device in claim 1 wherein each of said bellows springs has a generally tapered configuration from one end to the other; the inner portions of said bellows legs being integrally joined to form inner junctures; said inner junctures being radially displaced from each other causing the polymer forming said inner junctures to be non-coincident upon compression of the spring.

5. The device in claim 4 wherein said springs are arranged in a pattern, with some of said springs in said pattern being inverted; said inverted springs being intermeshed with the remaining springs in different predetermined depths in selected zones of said article to create a zone of differentiated cushion firmness; and said intermeshed springs collectively having a multiple cushioning effect greater than that of the sum total of the individual springs.

6. The device of claim 1 wherein said legs of each bellows; and said bellows having inner junctures with a least about 50°; each of said arcuate junctures having a wall thickness less than the remaining portions of the bellows; and said bellows having inner junctures with a wall thickness greater than the remaining portions of the bellows.

References Cited by the Examiner

UNITED STATES PATENTS

| 1,648,951 | 11/1927 | Knepper | 5—353 |
| 2,878,012 | 3/1959 | Crites | 5—353 |
| 2,979,739 | 4/1961 | Krakauer | 5—345 |
| 3,111,344 | 11/1963 | Hoven et al. | 297—452 |

FOREIGN PATENTS

| 914,505 | 10/1946 | France. |

OTHER REFERENCES

German printed application No. 1,148,718, May 1963.

FRANK B. SHERRY, *Primary Examiner.*

C. A. NUNBERG, *Assistant Examiner.*

UNITED STATES PATENT OFFICE
CERTIFICATE OF CORRECTION

Patent No. 3,255,170                                June 14, 1966

Richard R. Knittel et al.

It is hereby certified that error appears in the above numbered patent requiring correction and that the said Letters Patent should read as corrected below.

Column 2, line 59, strike out "of uniform diameter"; column 9, line 50, for "develop" read -- envelop --; column 10, line 54, strike out "bellows; and said bellows having inner junctures with a" and insert instead -- bellows are at an angle with respect to each other of at --.

Signed and sealed this 26th day of September 1967.

(SEAL)
Attest:

ERNEST W. SWIDER           EDWARD J. BRENNER
Attesting Officer              Commissioner of Patents